UNITED STATES PATENT OFFICE.

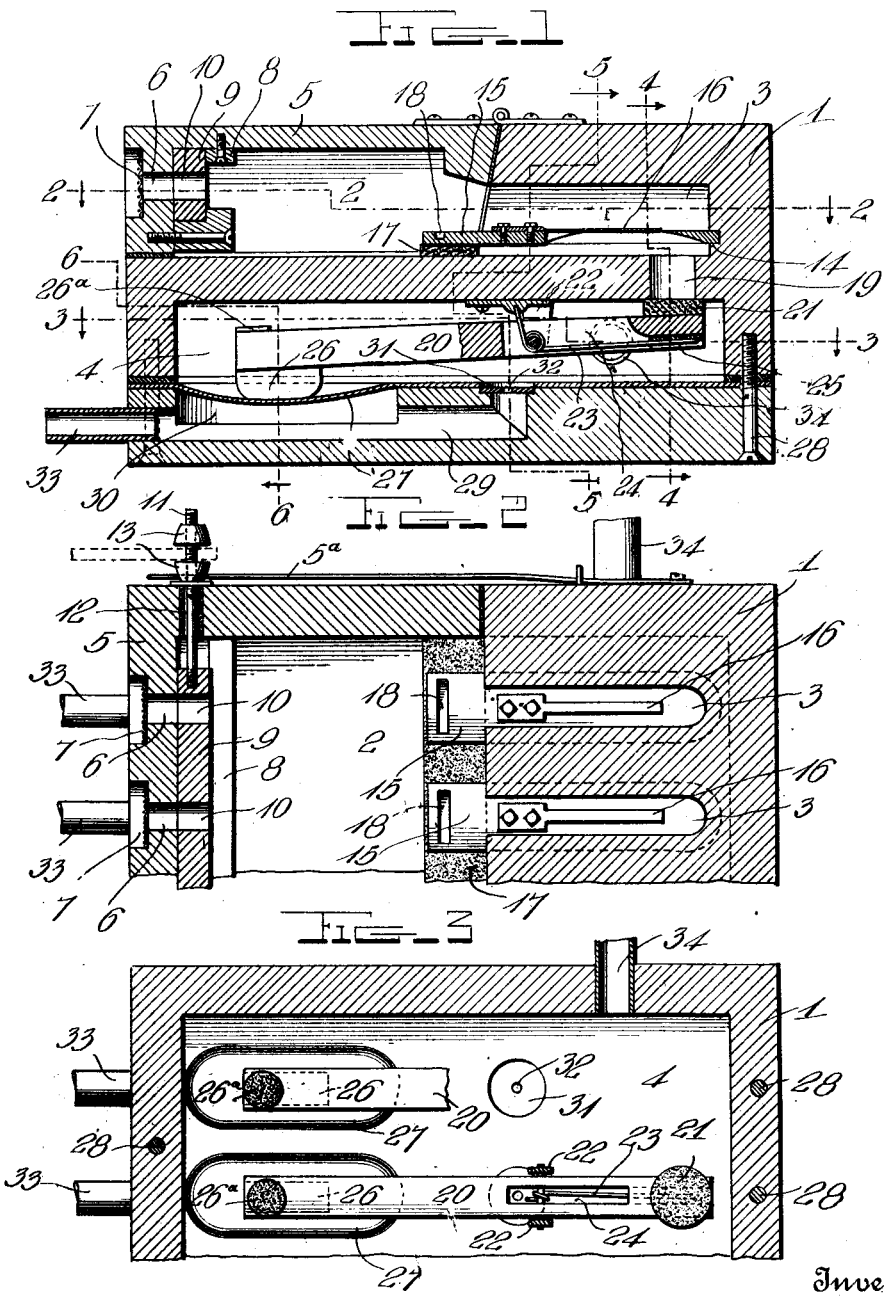

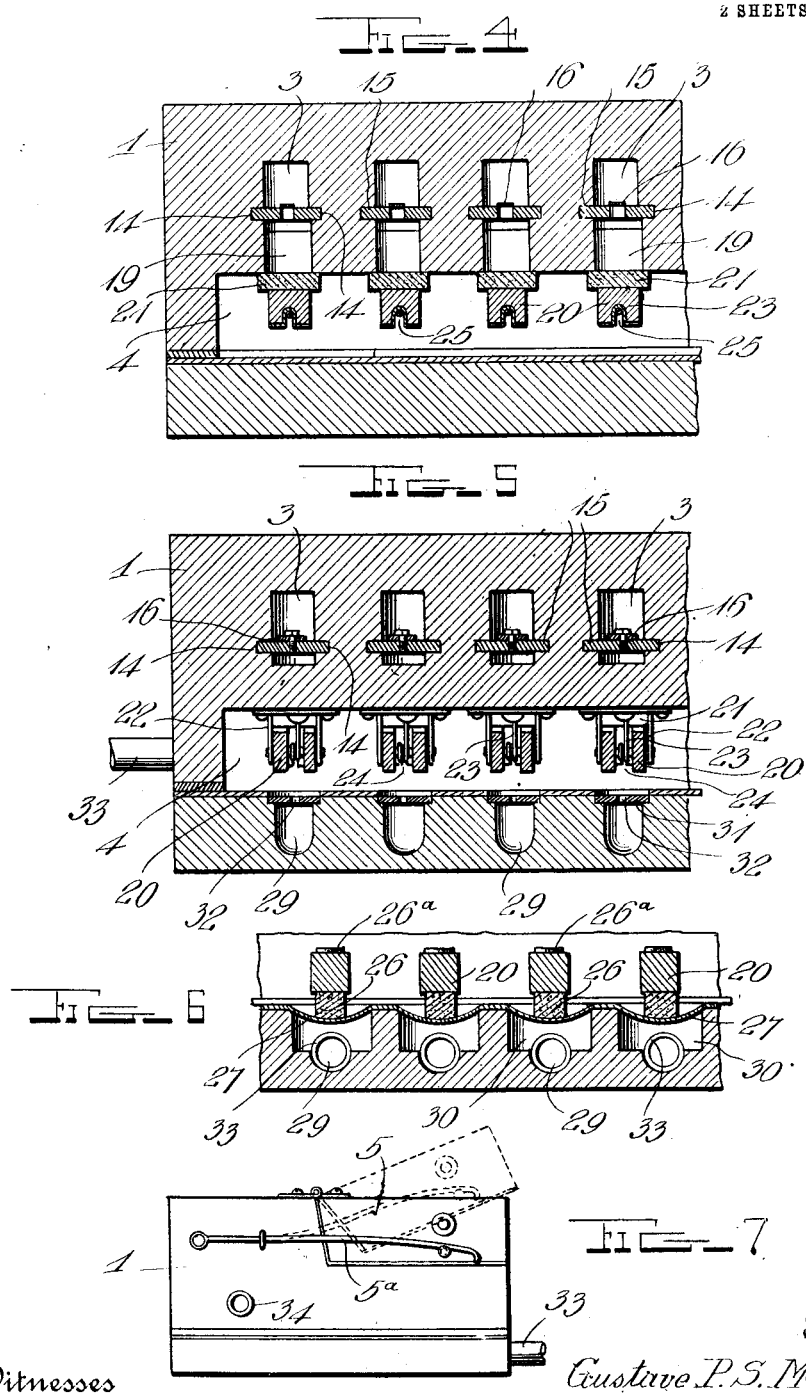

GUSTAVE P. S. MILLER, OF BROOKLYN, NEW YORK; NELLIE ANDERSON ADMINISTRATRIX OF SAID MILLER, DECEASED.

PNEUMATIC ACTION FOR MUSICAL INSTRUMENTS.

1,031,141.  Specification of Letters Patent.  Patented July 2, 1912.

Application filed April 10, 1911. Serial No. 620,070.

*To all whom it may concern:*

Be it known that I, GUSTAVE P. S. MILLER, a citizen of the United States, residing at Brooklyn, in the county of Kings and State of New York, have invented certain new and useful Improvements in Pneumatic Actions for Musical Instruments; and I do declare the following to be a full, clear, and exact description of the invention, such as will enable others skilled in the art to which it appertains to make and use the same.

This invention relates to musical instruments, and more especially to the pneumatic action thereof; and the object of the same is to improve the construction of that part of the casing which surrounds the sound box and to provide the latter with an improved form of regulator for controlling the volume of sound or the tone of the reeds. This and other objects are carried out by the construction set forth in the following specification and claims and as shown in the drawings wherein—

Figure 1 is a vertical sectional view through one of the sound boxes, reed cells, and vacuum chamber of the attachment; Fig. 2 is a horizontal sectional view through the sounding box and reed chambers of one end of the attachment taken on the line 2—2 of Fig. 1; Fig. 3 is a similar view through the vacuum chamber at one end of the attachment taken on the line 3—3 of Fig. 1; Fig. 4 is a cross sectional view through the reed cells, air passages and vacuum chambers of one end of the attachment taken on the line 4—4 of Fig. 1; Fig. 5 is a similar view on the line 5—5 of Fig. 1; Fig. 6 is a detail horizontal sectional view through the vacuum chamber and valve operating diaphragms of one end of the attachment on the line 6—6 of Fig. 1. Fig. 7 is an end view of the attachment showing in dotted lines the manner in which the sounding box is opened.

In the embodiment of the invention I provide a suitable casing 1 in the upper portion of which is formed a sounding box 2 and a series of reed cells 3. In the lower portion of the casing below the sounding box and reed cells is arranged a vacuum chamber 4. The upper portion 5 of one side of the casing forming the top and front of the sounding box is formed separate from the main portion of the casing and is hingedly connected at its inner edge to said main portion whereby said hinged portion of the sounding box may be swung upwardly to afford access to the reed cells for the purpose of removing the reeds when desired. The hinged portion 5 of the sounding box is held down in closed air tight engagement with the main portion of the casing by a spring 5ª which is preferably arranged as shown in Fig. 7 of the drawing.

In the outer end of the hinged portion 5 of the sounding box are formed a series of air inlet passages 6 which are covered at their outer ends by fine screens 7 which prevent the entrance of dust or other foreign matter to the sounding box and reed cells. Slidably mounted in suitable guides 8 and engaged with the inner side of the end of the portion 5 of the sounding box is a valve plate 9 having therein a series of air passages 10 which when the valve plate is shifted are adapted to be brought more or less into alinement with the passages 6, thus regulating the passage of air to the sounding box and controlling the volume of sound or tone of the reeds. The valve plate 9 is provided on one end with an operating stem 11 which projects through a packed guide passage 12 formed in one end of the sounding box and on said end are screwed nuts 13 by means of which any suitable valve adjusting mechanism may be connected to the stem 11.

In the side walls of the reed cells 3 are formed oppositely disposed guide grooves 14 with which are slidably engaged reed plates 15 to which are secured reed tongues 16. The inner ends of the plates 15 project into the sounding box and beneath said inner ends is arranged a felt packing strip 17 whereby air is prevented from passing into the reed cells beneath the plates. In the upper sides of the projecting ends of the plates are formed notches 18 which are adapted to be engaged by a suitable instrument for removing the reeds from the cells. Thus it will be seen that when the hinged portion of the casing is raised as above described, an instrument can be inserted into the notch 18 of any reed and the latter readily withdrawn.

In the portion of the casing below the reed cells and between the same and the vacuum chamber 4 are arranged air suction ports 19, said ports communicating with the adjacent ends of the vacuum chamber 4 as shown. Pivotally mounted in the vacuum chamber is a series of valve operating levers 20 said levers having on one end valve disks which are adapted to be brought into engagement with the ports 19 whereby the latter are closed and opened. The levers 20 are pivotally supported in suitable brackets 22 secured to the upper wall of the vacuum chamber and each of said levers is provided with a light spring 23 whereby the levers are actuated to normally hold the valves 21 in engagement with the ports 19 thus closing the latter. The springs 23 are preferably in the form of wire rods arranged in slots 24 formed in the levers 20. The springs when thus arranged have one end coiled around the pivot pins of the levers and secured in the brackets 22 while the other end of the spring is engaged with a packed groove 25 formed in the end of the lever as clearly shown in Figs. 1 and 4 of the drawings. The opposite ends of the levers are provided on their lower sides with cushions 26 which are engaged with flexible diaphragms 27 by means of which the levers are operated as will be hereinafter more fully described. On the upper sides of the ends of the levers above the cushions 26 are arranged sound deadening pads 26$^a$ which prevent the ends of the levers from striking the upper wall of the vacuum chamber when operated by the diaphragms 27, thus preventing any noise which might occur from the striking of the levers.

The lower side of the casing 1 forming the bottom of the vacuum chambers is detachably secured to the casing by screws 28 or similar fastening devices, and when these are removed the entire bottom of the casing and with it the diaphragm can be taken off so that access to the valve mechanism can readily be had. In the lower side of the casing adjacent to one edge thereof are formed a series of air inlet and exhaust passages 29 the outer ends of which are connected with diaphragm chambers 30 in which are arranged diaphragms 27 for operating the valve levers 20. The inner ends of the passages 29 open into the vacuum chamber and over said inner ends of the passages are arranged disks 31 having formed therein small bleed holes 32 the purpose of which will be hereinafter described. The outer ends of the passages 29 open through the adjacent side of the casing and have connected thereto air inlet tubes 33 leading to the tracker bar of the instrument. Connected to the vacuum chamber preferably at one end of the casing 1 is an air exhaust pipe 34 which leads to and is connected with the pumping or air exhausting mechanism of the instrument, whereby the air is drawn or exhausted from the vacuum chambers, air passages 29 and tubes 33.

In the operation of the device the air is exhausted from the vacuum chamber through the tube 34 by the pumping mechanism of the player action. This operation also exhausts the air from the passages 29 and tubes 33 leading to the tracker bar and from the diaphragm chambers 30 through the bleed hole 32 in the disk 31. When the air is thus exhausted and a hole in the music sheet uncovers a hole in the tracker bar the air rushes in through the tube 33 communicating with this hole in the tracker bar and into the passage 29 to which the opposite end of the tube is connected thus raising the diaphragm 27 and causing the latter to rock lever 20 and thus operate the valve thereon to uncover one of the air passages leading to a reed chamber. When the air passage 19 is thus opened the vacuum in the chamber 4 will draw the air from the sounding box and reed cell through the reed over the uncovered passage 19 thus causing the reed to vibrate and sound a note. This sounding or vibration of the reed is continued until the hole in the music passes over the hole in the tracker bar, thus preventing further air from entering the passage 29 whereupon the air in said passage and tube will enter the vacuum chamber through the bleed hole 32 thus equalizing the air pressure on opposite sides of the diaphragm and permitting the spring 23 to operate the lever 20 in the proper direction to close the valve thereon against its air passage 19 thus preventing further passage of air through the same and stopping the vibration of the reed.

It will be understood that there is one lever and operating mechanism for each reed and each opening in the tracker bar and that the series of reeds are independently operated in the manner described by the uncovering of the holes in the tracker bar.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. The herein described pneumatic action for musical instruments comprising a casing provided with a sound box having a portion hinged to the body of the casing and pierced with a series of air inlet passages, screens over said passages, a valve plate slidably mounted in said hinged portion and having passages adapted to be brought into and out of alinement with the air passages in the box whereby the passage of air through the box is controlled, a series of reed cells in the body portion of the casing communicating with said box, reeds in said cells, a vacuum chamber below said sounding box and reed cells, said chamber having ports to connect the same with said cells, and air-operated valves adapted to open and close said ports whereby the air from the sound box is permitted to pass through the reed cells and reeds to said vacuum chamber, thereby vibrating or sounding the reeds.

2. In a pneumatic action for musical instruments, the combination with a casing having in its upper portion a series of reed cells and in its lower portion a vacuum chamber communicating with said cells through suction ports, valves controlling said ports, levers carrying the valves, and means for actuating the levers by air pressure; of a separate portion of the casing including part of its top and front walls, inclosing a sound box in communication with said cells, a hinged connection between said separate portion and the rear fixed portion of the casing, guides beneath said top wall, the front wall being pierced with inlets, and a valve plate adjustably mounted in said guides, and having passages adapted to be brought more or less into register with those in said front wall, the plate being accessible when the hinged portion of the casing is raised.

In testimony whereof I have hereunto set my hand in presence of two subscribing witnesses.

GUSTAVE P. S. MILLER.

Witnesses:
C. E. WOOD,
CHAS. F. ESHBAUGH.